Patented May 23, 1950

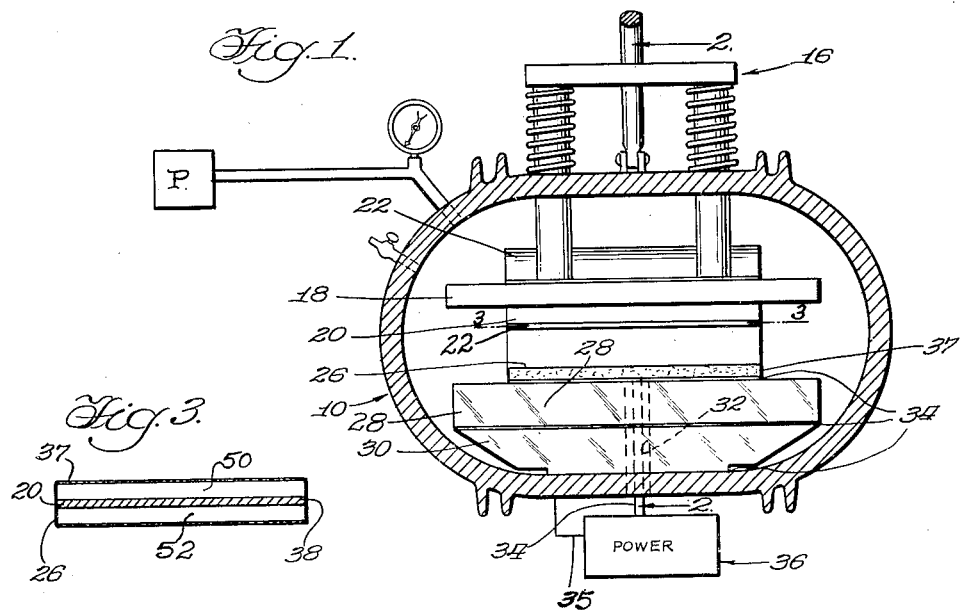
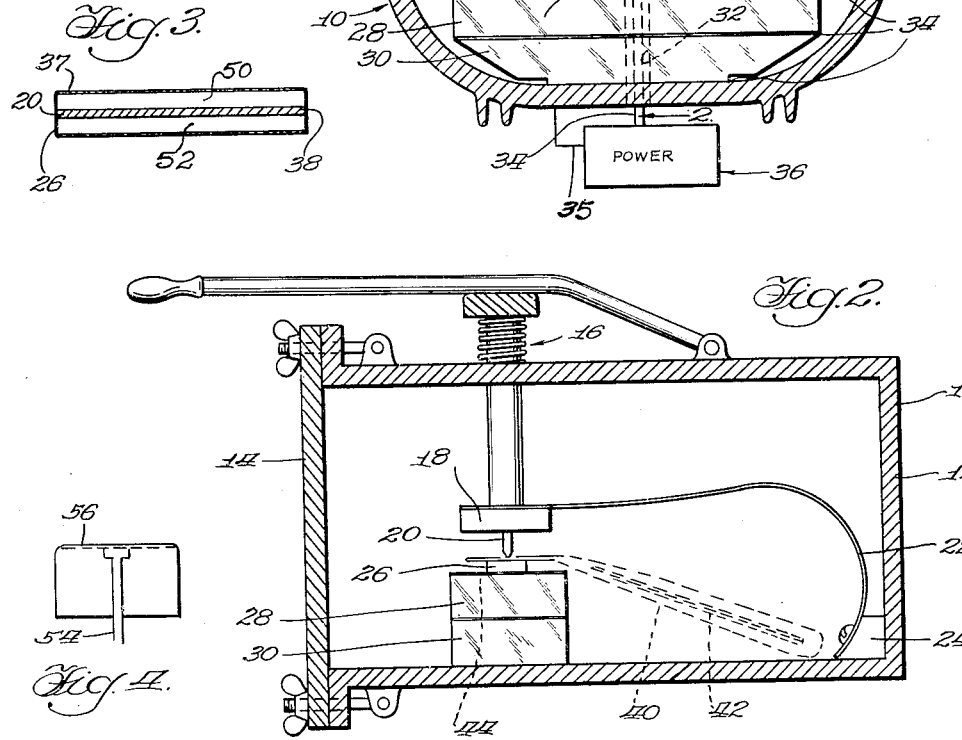
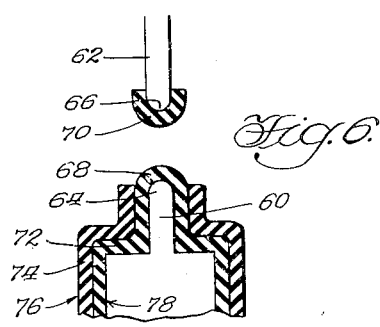

2,509,181

UNITED STATES PATENT OFFICE 2,509,181

METHOD AND APPARATUS FOR ELECTRONICALLY FUSING MATERIAL IN A HIGH PARTIAL VACUUM

Elmore Zimmerman, Elmhurst, Ill., assignor, by mesne assignments, to Electronic Products Corporation, a corporation of Illinois Application June 22, 1948, Serial No. 34,508

9 Claims. (Cl. 219—47)

This invention relates to a method of electronically sealing thermoplastic films such as Vinylite and Pliofilm in a substantial vacuum, and to apparatus for practicing the method. The method and apparatus is also useful in sealing laminated films comprising a layer of non-thermoplastic film such as cellophane and a layer of thermoplastic such as Pliofilm joined by an adhesive.

Applicant's invention is of importance in a somewhat specific field, namely, the packaging of food products which deteriorate rapidly in the presence of oxygen and nitrogen so that it is desirable to package these foods in a comparatively high vacuum. Thus, bacon deteriorates comparatively rapidly when exposed to air which either seeps into the package or which is actually in the package at the time of sealing. This difficulty has long been recognized and it is now possible to buy bacon on the market in a sealed cellophane and Pliofilm laminated wrapper in which there is very little air on the inside of the wrapper. The package was sealed in a vacuum of more than 25 inches as measured on a mercury manometer. The field in which applicant's invention is useful is not to be confused with another field wherein merchandise is packaged in a container in which the inside pressure is slightly less than atmospheric pressure. There are many processes and machines for packaging coffee in cans and peanuts in sealed bags wherein a lower inside pressure results from a cooling step after closure of the container or from withdrawing through a tube a small quantity of the air inside the package immediately prior to closing.

The standard way of packaging foods in cartons having a very low inside pressure is to place the food, as for example, bacon, in an open-ended plastic bag, then to place the bag in a chamber from which most of the air has been evacuated, and then to seal the end of the bag inside the chamber while so evacuated. Upon removing the package from the chamber, the air pressure presses the walls of the bag tightly against the bacon and theoretically there is produced a packaged bacon which may remain in the channels of trade for a comparatively long while before consumption.

In fact, however, this package has not proved commercially successful, and the reason is that the heat seals are not satisfactory. One large Chicago packer which had installed in its plant under lease several complicated packaging machines for bacon has withdrawn the product from the market because a substantial percentage of the heat seals did not hold. In the food business packaging failures must be kept at a small part of one per cent of the number of packages made. The reason that the heat seals failed was because they were made by radiant heat on comparatively thin sheet material. This type of sealing is commonly called hot bar sealing. These radiant heat seals have been recognized for some years as inferior to electronic heat seals, but attempts to electronically seal inside the vacuum chamber have met with failure.

This failure, and applicant's invention, can best be understood by stating what happens when an electronic heat seal is performed in a substantial vacuum. Assuming a vacuum chamber in which are mounted a standard pair of electronic electrodes, with exposed conductors leading thereto, which electrodes may be brought into operable engagement on opposite sides of the mouth of a bag, and assuming a source of radio frequency energy—20 megacycles and up—connected to the electrodes, the closing of the circuit after the chamber has been evacuated to more than 25 inches on a mercury manometer results in a bright glow in the chamber and no seal. The color of the glow varies from red to purple to blue. Heat in the layers of sheet material between the electrodes is not developed when most of the air is removed. This phenomenon has been encountered by those few engineers who have been asked to work on such sealing. The energy seems to be dissipated throughout the entire chamber, possibly by way of creating light.

Applicant reached this conclusion. So long as a substantial atmospheric pressure exists between the two electrodes, the release of energy occurs primarily between the electrodes because only in this space is the alternating field strong enough to strain the molecules in the work to produce heating; but where the atmospheric pressure is exceedingly low, the remaining air, particularly the comparatively rare elements such as argon and neon, act in the same manner as they do in a fluorescent light bulb and they become conductive. They bleed off energy from all exposed surfaces of the electrodes and dissipate it throughout the chamber by themselves forming a path for the electrical energy between the electrodes. The field between the electrodes is weakened and increasing the voltage and frequency does not produce the requisite strength in the field because the voltage must reach a point where actual arcing across the electrodes will occur. These gases apparently become ionized. If such reasoning is right, then the action of the gas can be defeated by insulating the gas or keeping it away from any conductive surface of an electrode and of associated conductors during the heat sealing step. This is the invention—insulating or spacing the rarified gases from one electrode so that the gases remain inert during the heat sealing step. As will appear later, this theory is subject to an important modification in dealing with electrodes whose faces carry a thermal buffer. The theory as thus far presented is useful in focusing attention on applicant's initial thinking and solution of the problem.

Referring to the drawings:

Fig. 1 is a front elevation of applicant's vacuum chamber with electronic heat sealing equipment mounted therein;

Fig. 2 is a sectional view taken on the line 2—2 of Fig. 1;

Fig. 3 is a view taken on the line 3—3 of Fig. 1;

Fig. 4 shows a type of insulated electrode;

Fig. 5 is an enlargement of the end of the two electrodes; and,

Fig. 6 is an end view of electrodes whose faces carry thermal buffers.

The apparatus shown in the drawings is laboratory equipment. A commercial packaging machine for practicing the invention would be quite different. The numeral 10 identifies a vacuum chamber having a back wall 12 and a removable front closure member 14. A vertically movable carriage 16 is suspended in any suitable manner from the top wall of the chamber 10 and carries a plate 18 from which is suspended a sealing bar or electrode 20. A copper conductor 22 is fastened to the plate 18 which is in electrically conductive relationship to the bar 20 and the copper plate 22 is bent as illustrated in Fig. 2 and fastened to one or more bosses 24 in electrically conductive relationship with the wall of the chamber 10.

The electrode 20 is wholly uninsulated. The large copper conductor 22 is employed for the purpose of minimizing potential gradient between the electrode 20 and the housing of the vacuum chamber 10. This housing is connected to the radio frequency ground in the power supply 36 by any suitable conductor 35. Theoretically, the potential of the electrode 20 is identical with that of the radio frequency ground in the power supply 36 but as a practical matter this is not possible. The important thing so far as this method and apparatus is concerned is to maintain the potential of the electrode 20 as close to the potential of all of the metal walls of the chamber 10 as possible. This electrode 20 is a typical electronic heat seal electrode.

The electrode 26 is a fixed electrode and differs from a standard electronic heat seal electrode in that all of its surfaces excepting that which is to engage the electrode 20 are insulated by a dielectric material from the atmosphere in the chamber 10. The electrode 26 is a metallic, conductive bar which is mounted on a pair of dielectric blocks 28 and 30. These blocks 28 and 30 are made from either Mycroy or Mycelex which are trade names for a lead borate glass and mica fused to each other under extreme pressures. In order to prevent passage of air, gaskets 34 are provided. A hole 32 extending through the wall of the chamber 10 and through the blocks 28 and 30 permit insertion of a copper lead 34 coming from the power supply 36 and this copper lead is fastened to the electrode 26. The electrode 26 is a metal bar and all of its sides are coated with a dielectric such as varnish or shellac 37.

Referring to Fig. 3, the line of engagement of the bottom of the electrode 20 with the electrode 26 is indicated by the shaded portion 38.

The power supply 36 provides an alternating current at a frequency of from 60 to 120 megacycles with a plus or minus voltage of perhaps 500.

In practicing applicant's invention, a bag 40 containing for example bacon 42, is positioned in the chamber as illustrated in Fig. 2 with its open end 44 between the electrodes. The composition of the bag material is important only in that it must be of thermoplastic material and capable of fusing as a result of standard electronic heating. Applicant has used bags made of vinyl resins, Pliofilm, polyethylene, Saran, and cellophane laminated with pliofilm or other thermoplastic. The test of the film's fusability in applicant's method is its energy loss factor which in the case of polyethylene is approximately $4/10,000$ which is lower than that of the other films mentioned. The loss factor is dependent not only on the base material itself but also on the plasticizers. Where the energy loss factor of the material is lower than $4/10,000$, the present voltages and frequencies may require substantial modification in order to fuse the material. After the bag has been positioned and the chamber door closed, the chamber is evacuated to more than a 25 inch vacuum. Thereupon, the electrode 20 is brought down against the neck of the bag into engagement with the electrode 26. The circuit from the power supply 36 is closed for the requisite length of time. During this time, there appears a reddish, purplish or bluish glow in the area indicated by the numeral 44 in Fig. 5. This glow is believed to be due to the action of the argon, neon and other inert gases in the rarified air in the chamber in contact with the uninsulated areas 50 and 52 in Fig. 3 and is believed to result in a loss of energy. The presence of vinyl film such as between the electrode 20 and the electrode 26 does not seem to matter. If the varnish is removed from the side surfaces 26 of the electrode 26, the glow will extend out from the electrodes to the arc indicated by the dot-dash line 48. If a standard electronic electrode, that is one that is not mounted in insulating blocks such as 28 and 30, is placed in the chamber, the glow will extend through the whole face of the chamber. The more glow, the less heat sealing. It follows that applicant might increase the efficiency of the electrode 26 by applying a line of varnish on the areas 50 and 52 in Fig. 3. However, the electrode as illustrated in Figs. 1, 2 and 3 is the one that has actually been made and while there is a loss, the loss is not sufficiently great to impair rapid sealing.

16—Ross—day pats—MAY 8—78740

The electrode 26 and blocks 28 and 30 shown in Figs. 1, 2 and 3 will be replaced in a commercial type by one in which only the top surface of the electrode is exposed. Applicant proposes to cast the electrode 54, referring to Fig. 4 in a dielectric molding compound. After hardening, the surface 56 will be ground down until the electrode 54 is exposed.

Applicant is of the opinion that his insulating of the electrode 26 from the inert gases in the rarified air would be wholly unnecessary if the vacuum were perfect. He believes that it is the ability of these gases to take up electric charges from the electrically conductive electrode's surface which causes the diffusion of energy which defeats sealing. At atmospheric pressure, the phenomenon does not occur because the oxygen and nitrogen molecules impair the activities of the inert gases and confine the release of energy to the space between the electrodes. The reason that a more perfect vacuum is not used arises from the time element in packaging. With suitable equipment, it is possible to draw a 25 to 29 inch vacuum in the chamber in a matter of seconds, but the time rapidly lengthens as a more perfect vacuum is sought.

It is immaterial as a matter of theory which electrode and associated conductors are dielectrically insulated. In order to further defeat any activity by the rarified gases in the chamber 10, it may be wise to coat all surfaces of the electrode 20 and exposed conductors including the inside chamber walls connected electrically to the electrode 20 with a dielectric.

The foregoing discussion has been based on the idea that the rare gases such as neon and argon must come into contact with a conductive surface in order to pick up electrical charges and become ionized. Applicant believes that the "must" in this theory is not sound because the gases can be charged and can become ionized without coming in contact with an electrically conductive surface carrying a potential by merely coming within the range of the effective field created by the selected potential in the electrode 26. Thus, applicant has increased the voltage across the electrodes 20 and 26 to a point where an arc readily occurs when the electrodes are in engagement with a film to be fused, and then by raising the handle so as to further space the electrodes so as to eliminate the arc, he has been able to produce the glow in the chamber even though the lower electrode 26 including its face is fully dielectrically insulated. In short, the potential in the electrode 26 may be raised to a point where the effective field around the electrode extends beyond the thickness of the dielectric insulation. By effective, applicant means that the electrode is able to charge the argon and neon molecules so that ionization takes place even though they never actually touch the surface of the conductor.

This becomes of great importance in performing good electronic heat sealing because, for reasons that will not be touched upon here, it is generally desirable to have a dielectric coating over the electrode faces. This coating may be a strip of tape or a hardened film which has low loss characteristics so that it does not fuse when the thermoplastic material does. This dielectric sheath is commonly called a thermal buffer. This is standard electronic heat sealing practice where heat sealing is conducted in atmospheric pressures and the reasons for putting thermal buffers on the faces of the electrodes—both electrodes—are as valid when the heat sealing takes place in a vacuum or partial vacuum as when it takes place at atmospheric pressures. This dielectric insulation interposes between the conductive faces of the electrodes an additional space and the potential difference between the two electrodes must be correspondingly increased. It follows, therefore, that if the electrode faces in applicant's partial vacuum chamber are insulated and if ionization of the gases in the rarified atmosphere of the chamber is to be prevented, not only must all other surfaces of one of the electrodes and conductors thereto be insulated, but they must possess sufficient additional insulation as to space the gases from these conductive surfaces by a thickness equal to the thickness of the insulation over the electrode faces plus the depth of the effective field created by the charge on the positive electrode.

This is illustrated in Fig. 6, where the two electrodes 60 and 62 have faces 64 and 66 over which is positioned a dielectric coating 68 and 70 respectively. When the voltage created is increased so as to provide the requisite molecular strain in the dielectric material to be fused between the electrodes, the effective field for ionizing the gases is projected beyond the surfaces of the insulation such as 72. This ionization results in the loss of energy which prevents heat sealing and prevents any proper adjustment of the radio frequency circuit. Consequently, applicant applies to the surface of the electrode other than the working face 64, additional dielectric insulation 74 so that the distance between the points 76 and 78 in Fig. 6 is greater than the depth of the effective field created by the potential circuit in the electrode 60. The foregoing follows the same general principles of the design for heat sealing electrodes having uninsulated faces, but recognizes the desirability of insulating those faces from the standpoint of good heat sealing and it further recognizes the fact that the gases can become ionized even though they do not contact a conductive surface.

Having thus disclosed his invention, applicant claims:

1. An electronic heat sealer comprising a substantially fluid-tight chamber, means for producing a partial vacuum in said chamber, a pair of electrodes having complementary heat sealing faces disposed in said chamber, means for moving the sealing faces toward and away from each other, means for establishing between said electrodes an electrostatic field at a potential sufficiently great to ionize gases in the chamber, and a layer of electrically nonconductive material over substantially all surfaces of one electrode and its associated conductors that otherwise would be exposed to gases that may be in contact with the other electrode.

2. An electronic heat sealer comprising a substantially fluid-tight chamber, rarified electrically conductive gases in the chamber, a pair of electrodes having complementary heat sealing faces disposed in said chamber, means for moving the sealing faces toward and away from each other, means for establishing between said electrodes an electrostatic field at a potential sufficiently great to ionize gases in the chamber, and a layer of dielectric material on all surfaces of one electrode excepting its face and all surfaces of associated conductors connected therewith within the chamber.

3. An electronic heat sealer comprising a substantially fluid-tight chamber made of electrically conductive material, means for producing a partial vacuum a grounded heat sealing electrode within the chamber, a second electrode therein, means for establishing between said electrodes an electrostatic field at a potential sufficiently great to ionize gases in the chamber, means for moving the electrodes toward and away from each other, and an electrically conductive sheath over substantially all surfaces of the latter electrode and associated conductors that otherwise would be exposed to gases that may be in contact with the first electrode.

4. In any process for sealing together layers of dielectric material in a partial vacuum by pressing them between two electrodes while concurrently establishing a high frequency, electrostatic field between electrodes where the potential gradient is sufficient to ionize or produce a corona effect in the gas in which the material and electrodes are positioned, the step of maintaining one of the electrodes in sufficient, electrical nonconductive relationship with the gas so that no substantial ionization of the gas, with resulting impairment of the strength of the electrostatic field, occurs.

5. The process of sealing together thin films of dielectric material in a partial vacuum which comprises the steps of positioning the material between a pair of electrodes in an evacuated chamber, of creating a high frequency, electrostatic field between the electrodes of sufficient strength to fuse the thermoplastic material without breaking it down and at a potential sufficient to ionize gases in the partial vacuum, of concurrently moving the two electrodes toward each other and pressing the films together and of preventing the gases from coming into contact with a substantial portion of the conductive surfaces of one electrode and associated conductors.

6. The process of packaging perishable products in airtight, partially evacuated containers made of thermoplastic flexible material which comprises the steps of placing the product inside a sheet of wrapping material, of withdrawing most of the surrounding air from contact with the article and the wrapping material, and of electronically fusing layers of the wrapper to each other so as to completely enclose the article in the wrapper by a high frequency electrostatic field while concurrently insulating ionizable gases in the rarified atmosphere from one electrode creating the electrostatic field.

7. The process of packaging perishable food in airtight containers which comprises the steps of placing an article of food in an open-ended, thermoplastic bag, of placing the mouth of the bag between two electrodes inside a chamber, of drawing a partial vacuum in the chamber, of establishing a high frequency electrostatic field between the electrodes and through the layers of dielectric material forming the mouth of the bag at a potential sufficient to ionize and create a corona effect in the rare gases in the atmosphere of the partial vacuum, and of maintaining one electrode and associated conductors substantially nonconductive to the rare gases in the partial vacuum.

8. The process of packaging perishable food in airtight containers which comprises the steps of placing an article of food in an open-ended, thermoplastic bag, of placing the mouth of the bag between two electrodes inside a chamber, of drawing a partial vacuum in the chamber, of establishing a high frequency electrostatic field between the electrodes and through the layers of dielectric material forming the mouth of the bag at a potential sufficient to ionize and create a corona effect in the rare gases in the atmosphere of the partial vacuum, and of maintaining the hot electrode and associated conductors substantially non-conductive to the rare gases in the partial vacuum.

9. An electronic heat sealer comprising a substantially fluid-tight chamber, a pair of electrodes having complementary sealing faces disposed within said chamber, means for establish between said electrodes an electrostatic field at a potential sufficiently great to ionize gases in the chamber, means for moving the electrodes toward and away from each other, and a layer of nonconductive material covering sufficient portions of the combined surfaces of one electrode and associated conductors so as to substantially eliminate electrical impairment of the electrostatic field due to ionization of gases that may be in the chamber.

ELMORE ZIMMERMAN.

REFERENCES CITED

The following references are of record in the file of this patent:

UNITED STATES PATENTS

| Number | Name | Date |
| --- | --- | --- |
| 1,626,777 | Austin | May 3, 1927 |
| 2,022,839 | Austin | Dec. 3, 1935 |
| 2,079,708 | Hart | May 11, 1937 |
| 2,114,622 | Bergstein | Apr. 19, 1938 |
| 2,233,176 | Melton et al. | Feb. 25, 1941 |
| 2,235,394 | Berch | Mar. 18, 1941 |
| 2,325,652 | Bierwirth | Aug. 3, 1943 |
| 2,354,714 | Strickland | Aug. 1, 1944 |
| 2,401,991 | Walton et al. | June 11, 1946 |
| 2,403,800 | Hoyler | July 9, 1946 |

OTHER REFERENCES

"Food Materials and Equipment," November 1947, page 15, article entitled "Electronic Sealing of Plastic Films."